United States Patent [19]
Mano et al.

[11] Patent Number: 5,793,366
[45] Date of Patent: Aug. 11, 1998

[54] GRAPHICAL DISPLAY OF AN ANIMATED DATA STREAM BETWEEN DEVICES ON A BUS

[75] Inventors: Yoshizumi Mano, Cupertino; Chenchu L. Chilamakuri, Fremont, both of Calif.; Andrew M. Proehl, New York, N.Y.

[73] Assignees: Sony Corporation, Tokyo, Japan; Sony Electronics, Inc., Park Ridge, N.J.

[21] Appl. No.: 747,452

[22] Filed: Nov. 12, 1996

[51] Int. Cl.⁶ ........................................ G06F 3/00
[52] U.S. Cl. .................. 345/329; 345/349; 345/356; 345/969; 345/977; 395/200.54
[58] Field of Search ................... 345/326–358, 345/969, 977; 395/200.53, 200.54, 200.55, 200.56, 200.5

[56] References Cited

U.S. PATENT DOCUMENTS

| | | | |
|---|---|---|---|
| 5,261,044 | 11/1993 | Dev et al. | 345/329 |
| 5,394,556 | 2/1995 | Oprescu | 395/200.5 X |
| 5,408,603 | 4/1995 | Van De Lavoir et al. | 345/329 X |
| 5,500,934 | 3/1996 | Austin et al. | 395/329 X |
| 5,606,664 | 2/1997 | Brown et al. | 345/329 X |
| 5,682,489 | 10/1997 | Harrow et al. | 345/329 |

OTHER PUBLICATIONS

Borg, "Visual Programming and UNIX", IEEE, pp. 74–79, 1989.

*Primary Examiner*—John E. Breene
*Attorney, Agent, or Firm*—Haverstock & Owens LLP

[57] ABSTRACT

A graphical user interface (GUI) displays graphical images representing devices coupled to a bus structure. The bus structure is also graphically represented and illustratively coupled to each of the graphical device images. Preferably, the bus structure is an IEEE 1394 serial bus. The system is preferably a computer system. Alternatively, the system is a television, monitor or other display system coupled to and capable of communicating over the serial bus and including a control processor and a display device. When a device is added to the serial bus, a graphical image representing that device is automatically displayed in the graphical user interface. Similarly, when a device is removed from the serial bus, the graphical image representing that device is grayed out, leaving a shadow of the graphical image until the device is either re-coupled or the system is powered off. Tasks performed by the devices coupled to the serial bus are also controlled and monitored by the user through the graphical user interface of the computer system. In order to control such tasks, a cursor control device is used to choose options displayed in the graphical user interface. One or more task windows are included in the interface which help the user select the task to be performed. Once selected, controls, commands and data related to that task are displayed within a control display window of the graphical user interface. When a task requires data to be sent between devices, the flow of data between the devices over the serial bus network is graphically represented by an animated data stream within the graphical representation of the bus structure. When the data stops flowing between the devices, the animated data stream disappears. When a device is added to the serial bus, an animated stream of data temporarily flows between the graphical image of the new device and the computer system.

27 Claims, 5 Drawing Sheets

GRAPHICAL DISPLAY OF AN ANIMATED DATA STREAM BETWEEN DEVICES ON A BUS

FIELD OF THE INVENTION

The present invention relates to the field of computers having graphically-oriented user interfaces. More particularly, the present invention relates to the field of monitoring the operation of devices through a graphical user interface displayed on a computer.

BACKGROUND OF THE INVENTION

In most modern computer systems an operating system provides a graphical interface for the computer user. The user can run application programs, manipulate files, and perform most other necessary functions through this graphical interface by manipulating images on the computer's display. This manipulation is accomplished by using cursor control keys and other keyboard keys or by using a cursor controlling peripheral device such as a joystick, mouse or trackball.

In such systems, when a program or application is loaded into the system it is frequently represented on the display by a small graphical image or icon which identifies the program to the user. For example, a word processing program might be represented by a graphical image of a piece of paper having lines of text on it and a writing instrument such as a pencil or pen. This is particularly so if the program has been removed from the screen and is running in the background. On a multitasking computer, several programs or applications can be running at once, each of which would be represented by its own graphical image.

When a new device is coupled to the computer system it is not always represented graphically on the interface. For devices that are controlled by software loaded on and run by the computer system, a graphical image or icon is usually displayed somewhere on the interface or in a pull-down menu. This graphical image or icon for display is usually selected by the user when the software is loaded. In other systems, the image or icon is displayed under the control of the loaded software. For devices that are coupled to and work in conjunction with, but are not controlled by, the computer system, a graphical image or icon may not be displayed on the interface.

The IEEE 1394 standard, "P1394 Standard For A High Performance Serial Bus," Draft 8.01v1, Jun. 16, 1995 is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin compared to other bulkier cables used to connect such devices. A node on the IEEE 1394 serial bus is considered a logical entity with a unique address on the bus structure. Each node provides an identification ROM, a standardized set of control registers and its own address space.

The IEEE 1394 serial bus provides plug and play capabilities for applications. Devices can be added and removed from an IEEE 1394 bus while the bus is active. If a device is so added or removed the bus will then automatically reconfigure itself for transmitting data between the existing nodes. However, for a user of an application at a node coupled to the bus, there is no specified method or apparatus for displaying the devices coupled to the IEEE 1394 serial bus. There is also no prescribed method for monitoring the activity of the devices coupled to the IEEE 1394 serial bus. To control any of these devices, the user must physically operate each device separately through a control panel on the face of that device. In the alternative, it is well known that infrared control devices exist for a variety of home entertainment type products such as television, VCR, and sound systems. There are even a number of so-called 'universal remote' products available that can control a number of different brands or types of equipment. However, the inventors are not aware of any control device that can control any IEEE 1394 device. Further, there is no device that displays the operation of functions. For example, if a user desired to copy a video sequence from a video optical disk onto a tape in a VCR, the user could separately control the optical disk player to play the sequence and control the VCR to record for a period of time. However, there would be no convenient means for the user to actually confirm that the desired operation was taking place other than to examine the displays on the control panels for the two devices to determine whether each device was separately performing the desired function.

What is needed is a control device and interface that allows the user to control a variety of devices from a common source using a common control interface. What is further needed is an information conveying means to apprise a user that certain operations are occurring. What is needed is a graphical user interface which will display the devices coupled to a serial bus network, through which the user has the ability to monitor the activity of the devices.

SUMMARY OF THE INVENTION

A graphical user interface (GUI) displays graphical images representing devices coupled to a bus structure. The bus structure is also graphically represented and illustratively coupled to each of the graphical device images. Preferably, the bus structure is an IEEE 1394 serial bus. The system is preferably a computer system. Alternatively, the system is a television, monitor or other display system coupled to and capable of communicating over the serial bus and including a control processor and a display device. When a device is added to the serial bus, a graphical image representing that device is automatically displayed in the graphical user interface. Similarly, when a device is removed from the serial bus, the graphical image representing that device is grayed out, leaving a shadow of the graphical image until the device is either re-coupled or the system is powered off. Alternatively, the application can be implemented to remove the device from the graphical user interface as soon as that device is removed from the serial bus. In a further alternate embodiment, the device is also grayed out within the graphical user interface when the device is powered off, but remains coupled to the serial bus. Tasks performed by the devices coupled to the serial bus are also controlled and monitored by the user through the graphical user interface of the computer system. In order to control such tasks, a cursor control device is used to choose options displayed in the graphical user interface. One or more task windows are included in the interface which help the user select the task to be performed. Once selected, controls, commands and data related to that task are displayed within a control display window of the graphical user interface. When a task requires data to be sent between devices, the flow of data between the devices over the serial bus network is graphically represented by an animated data stream within the graphical representation of the bus structure. When the data stops flowing between the devices, the animated data stream disappears. When a device is added to the serial bus, an animated stream of data temporarily flows between the graphical image of the new device and the computer system.

DETAILED DESCRIPTION OF THE PREFERRED EMBODIMENT

A graphical user interface displays graphical images representing devices coupled to a system through a serial bus network. When a device is added to the serial bus network, a graphical image representing that device is displayed on the graphical user interface. Similarly, when a device is removed from the serial bus, the graphical image representing that device is grayed out in the graphical user interface. In the preferred embodiment, the shadow of the graphical image remains and if the device is again added to the serial bus, the full color of the graphical image is reinstated. When the system is powered off and then powered on, only those devices actually coupled to the serial bus are displayed within the graphical user interface. Accordingly, when a device is removed from the serial bus, the graphical image representing that device is grayed out and then removed when the system is powered off and then powered back on, if the device was not re-coupled to the serial bus. Alternatively, the graphical image is removed as soon as the device is removed from the serial bus. In a further alternate embodiment, the graphical image is also grayed out when the device is powered off, but remains coupled to the serial bus, signalling to a user of the graphical user interface that the device is currently unavailable. The bus structure is also graphically represented and illustratively coupled to the graphical images of the devices. The graphical user interface also displays an animated stream of data representing the flow of data between devices. The animated stream of data is visible to the user within the graphical representation of the bus structure when a device is sending data to another device over the serial bus network. Preferably, the serial bus network is an IEEE 1394 serial bus. The graphical user interface is preferably displayed on a computer system. However, the graphical user interface is alternatively displayed on a television, monitor or other system which is coupled to the serial bus network and which includes a display device.

Through the graphical user interface, a user also has the ability to control the operation of the devices coupled to the serial bus network. In order to control and initiate tasks to be performed by the devices, a cursor control device is used by the user to choose options displayed on the graphical user interface. The cursor control device can be a mouse, keypad, trackball, remote control or other device, depending on the configuration of the host system. Further, the cursor control device can be wired or wireless using radio, infrared or any other appropriate technology. When a task requires data to be sent from one device to another, the flow of data between the devices over the serial bus network is graphically represented by the animated data stream. The user can also then monitor the operation of the devices coupled to the serial bus network.

Figure 1:
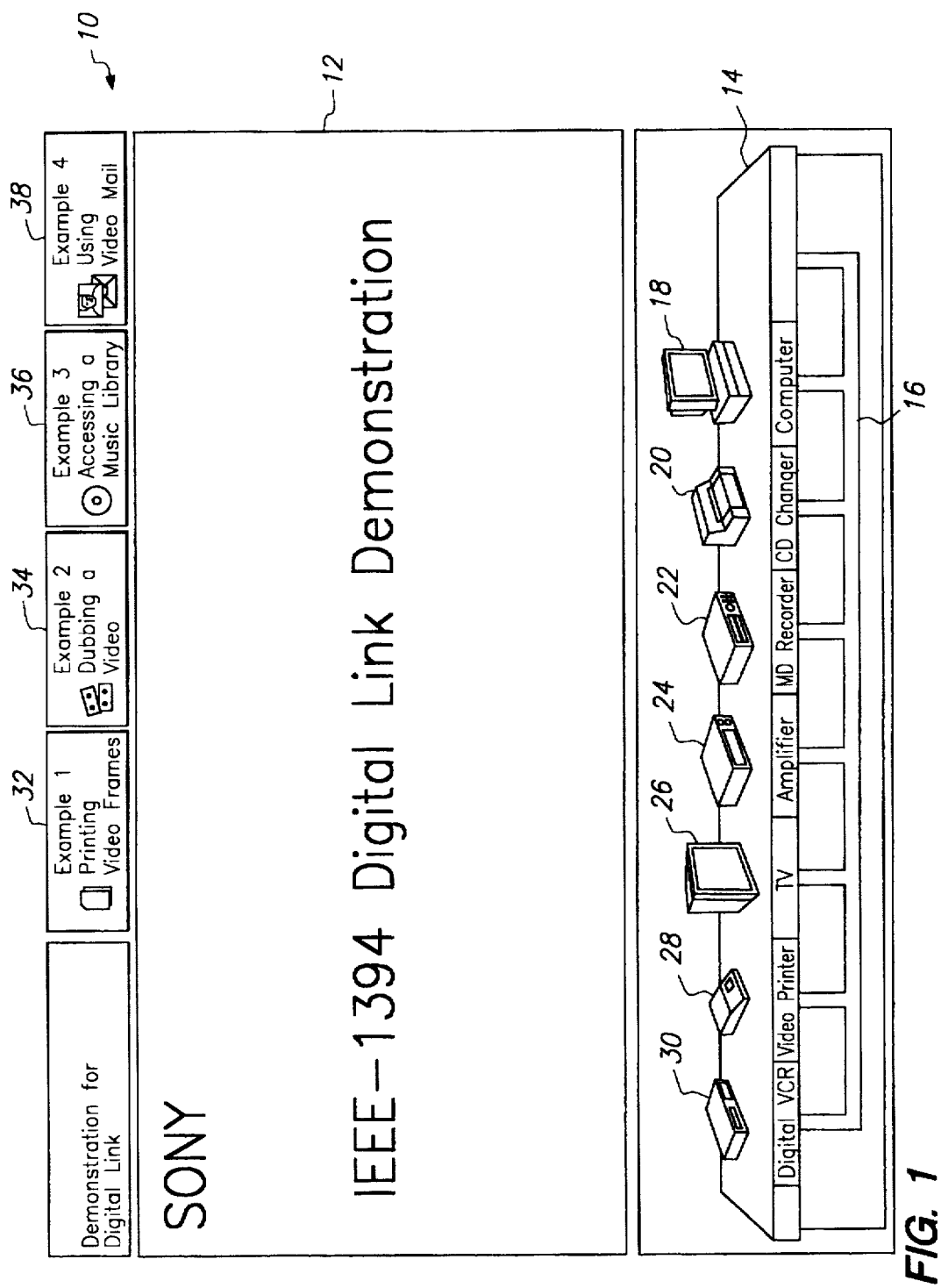
FIG. 1 illustrates a graphical user interface according to the present invention.

A graphical user interface according to the present invention is illustrated in FIG. 1. The graphical user interface 10 includes a bus display window 14 and a control display window 12. The bus display window 14 displays the devices which are coupled to the serial bus network. A graphical representation of the bus structure 16 is shown connecting each of the represented devices together. A computer, on which the graphical user interface is displayed, is coupled to the bus structure. In the bus display window 14 of the graphical user interface 10, a graphical representation of the computer 18 is shown connected to the graphical representation of the bus structure 16. Also shown connected to the bus structure 16 are a compact disk (CD) changer 20, a magnetic disk (MD) recorder 22, a stereo amplifier 24, a television 26, a video printer 28 and a digital video cassette recorder (VCR) 30. It will be readily understood that this collection of members on the bus is exemplary only and in no way is intended to limit the scope of this invention or the claims appended hereto.

Communications are directed to the user through the control display window 12. The user also enters control commands and chooses options for a current task through the control display window 12. A user enters the control commands and chooses the options using a cursor control device. Tasks available to be performed and controlled through the graphical user interface are displayed in the task windows 32, 34, 36 and 38. A user chooses a task to be performed using the cursor control device. Once chosen, a current task is displayed in the control display window 12. The task windows 32, 34, 36 and 38 preferably display generic tasks based on the general capabilities of the system. Alternatively, the task windows 32, 34, 36 and 38 display specific tasks based on the type of devices coupled to the serial bus network and the capabilities of those devices. As should be apparent to those skilled in the art, the scope of the present invention is not limited to the number of tasks herein described for display within the interface. Depending on the system, any appropriate number of tasks can be displayed within the interface.

Figure 2:
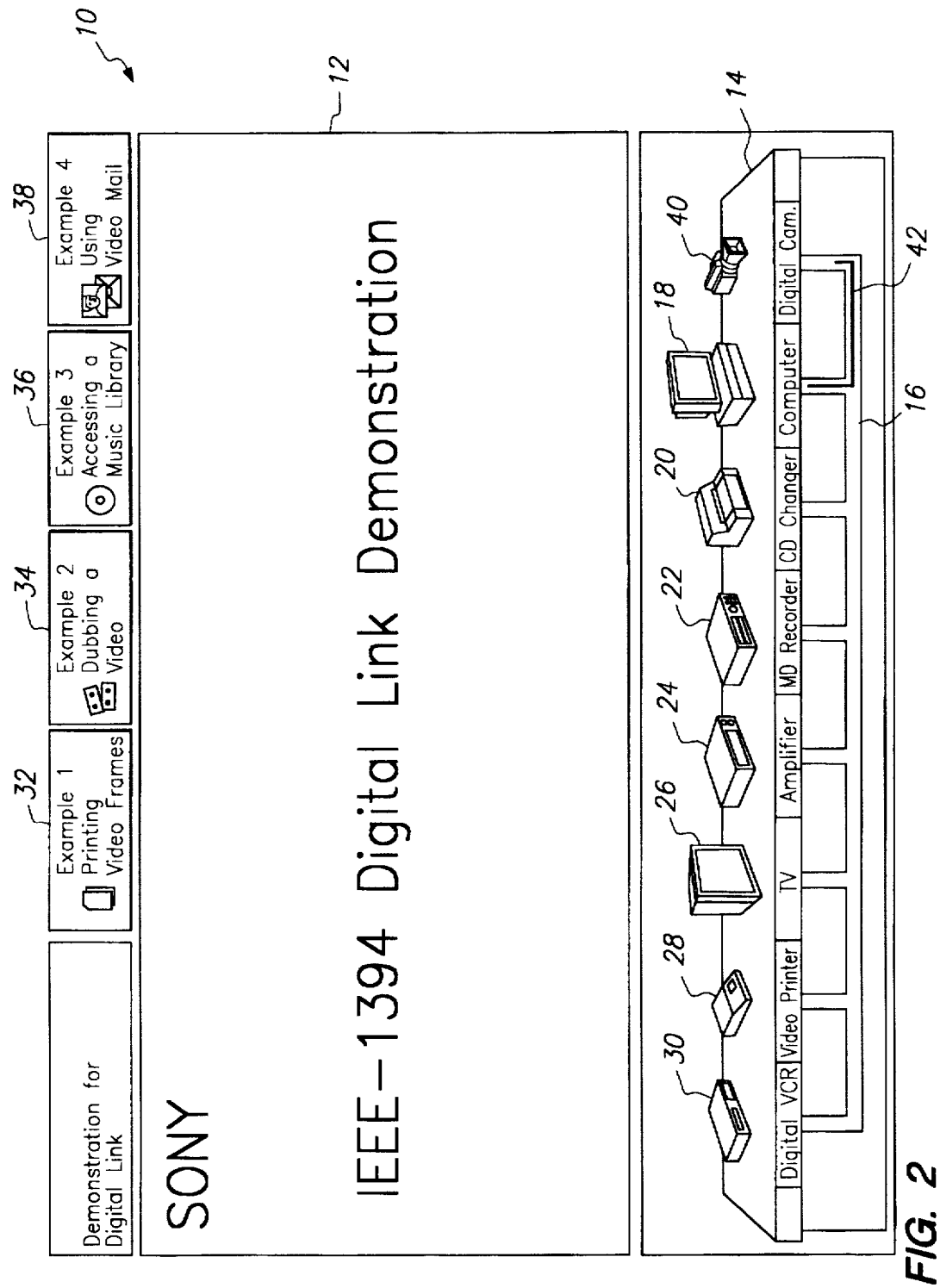
FIG. 2 illustrates the graphical user interface according to the present invention after an additional device is added to the serial bus network.

The change in the graphical user interface 10 when an additional device is connected to the serial bus network is illustrated in FIG. 2. When the digital camcorder is first coupled to the serial bus network, a communication is sent across the serial bus identifying the type of device that has just been coupled to the serial bus and the address of that device. The host system displaying the graphical user interface 10, receives that communication and determines that a new device has just been coupled to the serial bus, in this example a digital camcorder. The host system then obtains an image for the digital camcorder from an image library. The image library is maintained in the host computer system's memory and contains images of different devices that could be coupled to the serial bus. Alternatively, the computer system will obtain the image of the device from the memory of the device itself. The image of the digital camcorder is then displayed within the bus display window 14 as the graphical representation of the digital camcorder 40. When the graphical representation of the digital camcorder 40 is first displayed within the bus display window 14, an animated data stream 42 is illustrated within the representation of the bus structure 16, between the graphical representation of the digital camcorder 40 and the graphical representation of the host computer system 18, representing the initializing communication between the two devices. The graphical representation of the digital camcorder 40 will be displayed within the bus display window 14 in full color, as long as the digital camcorder is coupled to the serial bus network. If the digital camcorder is removed from the serial bus network, the graphical representation of the digital camcorder 40 is grayed out, leaving a shadow or outline of the digital camcorder. If the digital camcorder is then re-coupled to the serial bus network before the system is powered off, the graphical representation of the digital camcorder 40 is reinstated in full color. If the system is powered off before the digital camcorder is re-coupled to the serial bus network, then the graphical representation of the digital camcorder 40 is removed, when the system is again powered on. In an alternate embodiment, the graphical representation of the digital camcorder 40 is removed as soon as the digital camcorder is removed from the serial bus network. In a further alternate embodiment, the graphical representation of the digital camcorder 40 is grayed out if the digital camcorder is powered off and is still coupled to the serial bus network. This demonstrates to the user that the digital camcorder is coupled to the serial bus network, but is currently unavailable.

Figure 3:
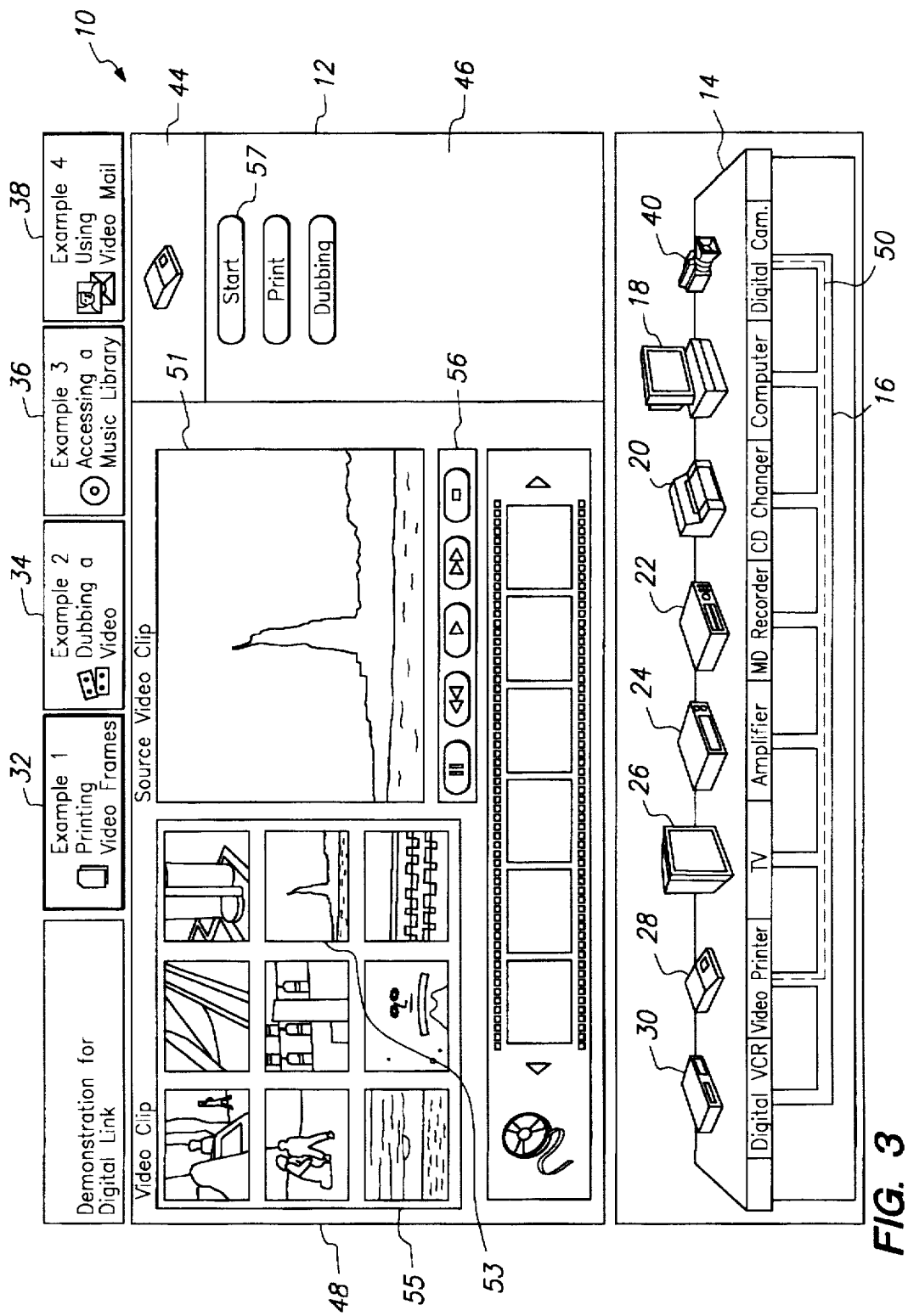
FIG. 3 illustrates a printing video frames task displayed within the control display window of the graphical user interface.

A current selected task, chosen by the user is displayed within the control display window 12 in the graphical user interface 10 illustrated in FIG. 3. The chosen current task illustrated in FIG. 3, is printing video frames from the digital camcorder on the video printer. A user chooses this task by selecting the printing video frames task, within the task window 32, using the cursor control device. When a particular task is chosen the button corresponding to that task is highlighted. When a current task is displayed within the control display window 12, the control display window 12 includes a device subwindow 44, a commands subwindow 46 and a task control subwindow 48. The graphical representation of the device to be used to complete the task is displayed in the device subwindow 44. In the printing video frames task displayed in FIG. 3, the graphical representation displayed within the device subwindow 44 is the graphical representation of the video printer.

The commands to be chosen by the user are displayed within the commands subwindow 46. In the printing video frames task displayed in FIG. 3, the commands available to the user are start, print and dubbing. A user selects one of the commands in the commands subwindow 46 using the cursor control device. Not all of the displayed commands are available for selection at all times. When available for selection, a command is highlighted, as is the start command 57 in FIG. 3.

The task control subwindow 48 displays the options available to the user for completing the task. In the printing video task displayed in FIG. 3, video frames from which the user can select for printing are displayed in a frame window 55 within the task control subwindow 48. The video frames to be displayed are read from a video source, in this case the digital camcorder. The displayed video frames occur at a predetermined interval on the tape within the digital camcorder. Preferably, in the printing video frames task displayed in FIG. 3, the video frames are displayed in one second intervals within the frame window 55. The user can scroll through these video frames using the control selection options 56, displayed within the task control subwindow 48. The user selects one of the control selections 56 using the cursor control device. The video frames will then be displayed at one second intervals at a rate and in an order based on the control selection option chosen by the user, e.g. play, fast forward, rewind, stop or pause.

The user selects one or more of the video frames displayed within the frame window 55 for printing using the cursor control device. In the example illustrated in FIG. 3, the user has selected the video frame 53. Once selected, the video frame 53 is first displayed within the selected frame window 51 and will be printed once the user enters the print command from the commands subwindow 46.

When a video frame is being printed and data is being sent from the digital camcorder to the video printer, an animated stream of data 50 is illustrated within the representation of the bus system 16. The animated stream of data 50 is shown flowing from the graphical representation of the digital camcorder 40 to the graphical representation of the video printer 28. This animated stream of data 50 allows a user to monitor the operation of the devices coupled to the serial bus network.

Figure 4:
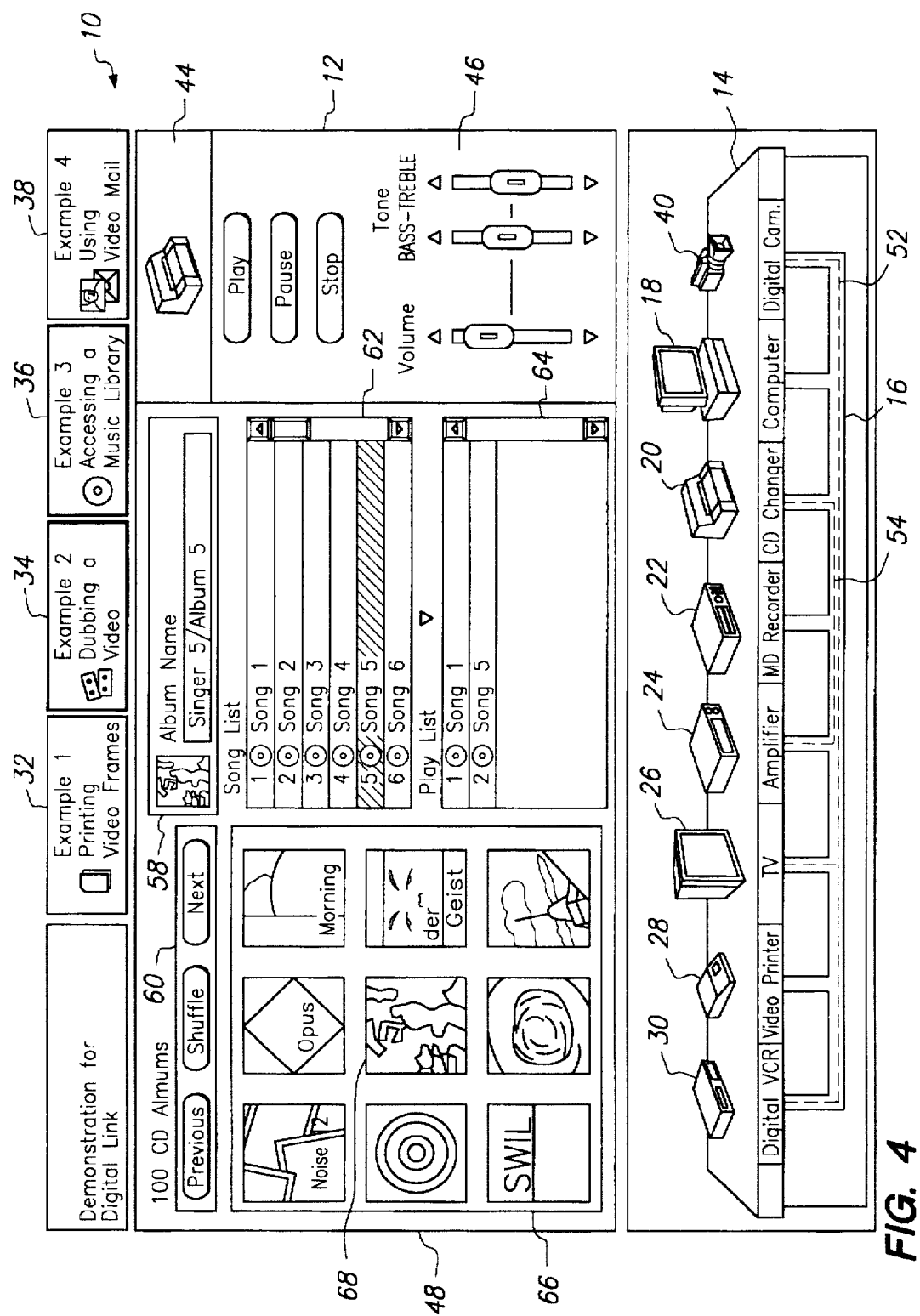
FIG. 4 illustrates an accessing a music library task displayed within the control display window of the graphical user interface.

A current selected task of accessing a music library is displayed within the control display window 12 in the graphical user interface 10 illustrated in FIG. 4. The task of accessing a music library allows a user to play a CD stored within the CD changer through the stereo amplifier. A user chooses this task by selecting the accessing a music library task, within the task window 36, using the cursor control device. The graphical representation of the CD changer is displayed within the device subwindow 44. The commands subwindow 46 includes play, pause and stop commands as well as slidable controls for volume, bass and treble, which are selected and controlled by the user using the cursor control device. In the accessing a music library task, displayed in FIG. 4, available music CDs are displayed in a CD window 66. A user scans through the available music CDs using the control selection options 60 and the cursor control device.

A user selects one of the CDs displayed in the CD window 66 using the cursor control device. Once selected the title of the CD is displayed in an Album Name subwindow 58. In the example illustrated in FIG. 4, the selected CD is the CD 68. The titles of the available songs on the selected CD are displayed in the Song List subwindow 62. From the Song List subwindow 62, a user can select songs to be played using the cursor control device. The selected songs to be played are listed in the selected order in the Play List subwindow 64.

When a song from a CD is being played and data is being sent from the CD changer to the amplifier, an animated stream of data 54 is illustrated within the representation of the bus system 16. The animated stream of data 54 is shown flowing between the graphical representation of the CD changer 20 and the graphical representation of the stereo amplifier 24.

In the example illustrated in FIG. 4, a task of dubbing a video has previously been initiated by a user. This task involves taking the selected parts of the tape in the digital camcorder and copying onto a tape in the digital VCR while simultaneously playing the video on the television. This task is being completed at the same time the selected CD is being played. Accordingly, there are two simultaneous animated data streams flowing within the representation of the serial bus network 16. The animated data stream 54 is shown flowing between the graphical representation of the CD changer 20 and the graphical representation of the stereo amplifier 24 for the playing the CD task. An animated data stream 52 is shown flowing between the graphical representation of the digital camcorder 40, the graphical representation of the digital VCR 30 and the graphical representation of the television 26 for the dubbing video task. Once the task is complete and the data stops flowing between these devices, the animated data stream 52, of the graphical user interface will disappear.

The graphical user interface of the present invention allows a user to control and monitor the operation of devices preferably coupled together by an IEEE 1394 serial bus network. It should be apparent that the graphical user interface of the present invention can also be used to control and monitor devices coupled together in other types of networks. The bus display window 14 within the graphical user interface displays the devices coupled to the serial bus network. When a device is added to the serial bus network a graphical representation of that device is displayed within the bus display window 14. When a device is removed from the serial bus network the graphical representation for that device is grayed out within the bus display window 14, leaving a shadow of the graphical representation until the device is either re-coupled or the system is powered off. A graphical representation of the serial bus coupled to the devices is also illustrated in the bus display window 14. When data flows between devices on the serial bus network, an animated stream of data flows between the graphical representations of those devices, within the representation of the serial bus network. Accordingly, a user can monitor the activity and data communications on the serial bus network through the graphical user interface of the present invention.

The control display window 12 is used to communicate with the user and to allow the user to make selections and control the operation of the devices coupled to the serial bus network. The task windows 32, 34, 36 and 38 allow a user to select a task for display in the control display window 12.

Figure 5:
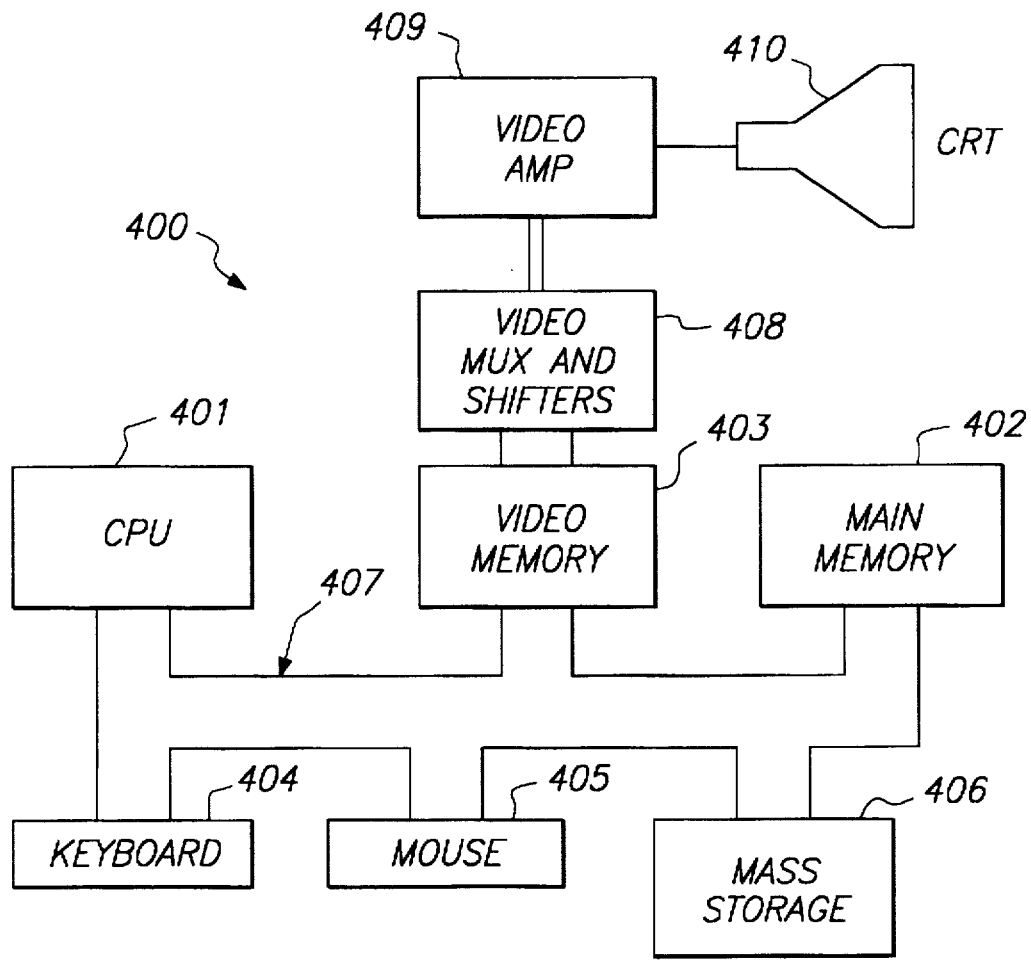
FIG. 5 illustrates a computer system on which the graphical user interface of the present invention is implemented.

While the graphical user interface of the present invention may advantageously be implemented on nearly any conventional computer system or other system under processor control, an exemplary computer system 400 on which the graphical user interface of the present invention is implemented is illustrated in FIG. 5. In FIG. 5, the computer system 400 includes a central processor unit (CPU) 401, a main memory 402, a video memory 403, a keyboard 404 for user input, supplemented by a conventional mouse 405 for manipulating graphic images as a cursor control device and a mass storage device 406, all coupled together by a conventional bidirectional system bus 407. The mass storage device 406 may include both fixed and removable media using any one or more of magnetic, optical or magneto-optical storage technology or any other available mass storage technology. The system bus 407 contains an address bus for addressing any portion of the memory 402 and 403. The system bus 407 also includes a data bus for transferring data between and among the CPU 401, the main memory 402, the video memory 403 and the mass storage device 406.

Coupled to a port of the video memory 403 is a video multiplex and shifter circuit 408, to which in turn a video amplifier 409 is coupled. The video amplifier 409 drives a monitor or display 410 on which the graphical user interface of the present invention is displayed. The video multiplex and shifter circuitry 408 and the video amplifier 409 convert pixel data stored in the video memory 403 to raster signals suitable for use by the monitor 410.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A graphical user interface for monitoring and controlling operation of devices coupled to a bus structure comprising:

a. a plurality of device images each representing a device coupled to the bus structure;

b. a bus structure representation illustratively coupled to each of the plurality of device images representing the bus structure between the devices; and c. an animated data stream illustrated within the bus structure representation between active device images representing data flowing on the bus structure between active devices.

2. The graphical user interface as claimed in claim 1 wherein the graphical user interface is displayed on a computer system having a display, a memory and an input device.

3. The graphical user interface as claimed in claim 2 wherein the computer system further comprises means for detecting presence and type of the devices coupled to the bus structure.

4. The graphical user interface as claimed in claim 3 wherein the input device is a mouse.

5. The graphical user interface as claimed in claim 1 further comprising one or more task windows each for displaying potential tasks to be selected by a user, wherein the potential tasks when selected are performed using one or more of the devices coupled to the bus structure.

6. The graphical user interface as claimed in claim 5 further comprising a control display window for displaying information and commands relating to a selected task and the devices associated with that task.

7. The graphical user interface as claimed in claim 1 wherein the bus structure is an IEEE 1394 serial bus.

8. A method of controlling and monitoring devices coupled to a bus structure comprising the steps of:

a. displaying a plurality of device images each representing a device coupled to the bus structure;

b. displaying a bus structure representation illustratively coupled to each of the plurality of device images; and c. displaying an animated data stream between active device images representing data communications between active devices over the bus structure.

9. The method as claimed in claim 8 wherein the bus structure is an IEEE 1394 bus structure.

10. The method as claimed in claim 8 further comprising the step of detecting presence and type of the devices coupled to the bus structure.

11. The method as claimed in claim 10 wherein the steps of displaying are all completed on a display of a computer system, wherein the computer system includes the display, a memory and an input device.

12. The method as claimed in claim 11 wherein the input device is a mouse.

13. The method as claimed in claim 8 further comprising the step of displaying one or more task windows each for displaying potential tasks to be selected by a user and completed by one or more of the devices coupled to the bus structure.

14. The method as claimed in claim 8 further comprising the step of displaying a control display window for displaying information and commands related to a selected task.

15. A system of controlling and monitoring devices coupled to a bus structure comprising:

a. a bus structure configured for providing communications between devices;

b. a plurality of devices coupled to the bus structure for communicating across the bus structure; and c. a graphical user interface for monitoring and controlling operation of the plurality of devices including:

i. a plurality of device images each representing a corresponding one of the plurality of devices;

ii. a bus structure representation illustratively coupled to each of the plurality of device images representing the bus structure; and iii. an animated data stream illustrated within the bus structure representation between active device images representing data flowing on the bus structure between the devices;

wherein operation of the devices is controlled through the graphical user interface.

16. The system as claimed in claim 15 wherein the graphical user interface is displayed on a computer system having a display, a memory and an input device.

17. The system as claimed in claim 16 wherein the graphical user interface further comprises one or more task windows each for displaying potential tasks to be selected by a user, wherein the potential tasks when selected are completed by one or more of the devices.

18. The system as claimed in claim 17 wherein the bus structure is an IEEE 1394 serial bus.

19. In a system having a control processor, a display, a memory and an input device, a graphical user interface comprising:

a. a plurality of device images each representing a device coupled to the bus structure;

b. a bus structure representation coupled to each of the plurality of device images representing the bus structure between the devices; and c. an animated data stream between appropriate device images for representing data communications between active devices over the bus structure.

20. The system as claimed in claim 19 further comprising a bus structure node circuit for detecting presence and type of the devices coupled to the bus structure and for communicating over the bus structure.

21. The system as claimed in claim 20 wherein the bus structure is an IEEE 1394 serial bus.

22. The system as claimed in claim 21 wherein the input device is a mouse.

23. The system as claimed in claim 19 wherein the graphical user interface further comprises one or more task windows each for displaying and selecting potential tasks to be completed by the devices coupled to the bus structure.

24. The system as claimed in claim 23 wherein the graphical user interface further comprises a control display window for displaying information and commands relating to a selected task.

25. In a computer system having a display, a memory and an input device, a graphical user interface comprising:

a. a plurality of device images each representing a device coupled to the bus structure;

b. a bus structure representation coupled to each of the plurality of device images representing the bus structure between the devices;

c. an animated data stream between appropriate device images for representing active devices and data communications between the active devices over the bus structure;

d. one or more task windows for displaying and selecting potential tasks to be completed by the devices; and e. a control display window for displaying information and commands relating to a selected task.

26. The computer system as claimed in claim 25 wherein the bus structure is an IEEE 1394 serial bus.

27. The computer system as claimed in claim 26 further comprising a bus structure node circuit for detecting presence and type of the devices coupled to the bus structure and for communicating over the bus structure.

* * * * *